United States Patent
Yu

(10) Patent No.: US 11,772,653 B2
(45) Date of Patent: Oct. 3, 2023

(54) VEHICLE CONTROL DEVICE, VEHICLE CONTROL METHOD, AND NON-TRANSITORY COMPUTER READABLE STORAGE MEDIUM

(71) Applicant: Honda Motor Co., Ltd., Tokyo (JP)

(72) Inventor: Kaijiang Yu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 167 days.

(21) Appl. No.: 17/511,563

(22) Filed: Oct. 27, 2021

(65) Prior Publication Data

US 2022/0126830 A1 Apr. 28, 2022

(30) Foreign Application Priority Data

Oct. 28, 2020 (JP) .................................. 2020-180327

(51) Int. Cl.
*B60W 30/18* (2012.01)
*B60W 30/165* (2020.01)

(52) U.S. Cl.
CPC ..... *B60W 30/18159* (2020.02); *B60W 30/165* (2013.01); *B60W 2552/05* (2020.02); *B60W 2552/10* (2020.02); *B60W 2554/4041* (2020.02); *B60W 2554/4042* (2020.02); *B60W 2554/4043* (2020.02); *B60W 2554/4044* (2020.02); *B60W 2554/801* (2020.02); *B60W 2554/802* (2020.02);
(Continued)

(58) Field of Classification Search
CPC ......... B60W 30/18159; B60W 30/165; B60W 2552/05; B60W 2552/10; B60W 2554/4041; B60W 2554/4042; B60W 2554/4043; B60W 2554/4044; B60W 2554/801; B60W 2554/802; B60W 2554/803; B60W 2554/804; B60W 60/00276; B60W 2554/4045; B60W 30/0956; B60W 30/08; B60W 30/18158; B60W 30/18154; G08G 1/166
See application file for complete search history.

(56) References Cited

U.S. PATENT DOCUMENTS

2017/0361841 A1* 12/2017 Kojo ................... B60W 30/17
2019/0171211 A1* 6/2019 Jang ..................... B60W 50/10
(Continued)

FOREIGN PATENT DOCUMENTS

JP 2015170233 9/2015

*Primary Examiner* — Peter D Nolan
*Assistant Examiner* — Ashley L Redhead, Jr.
(74) *Attorney, Agent, or Firm* — JCIPRNET

(57) ABSTRACT

A vehicle control device recognizes an intersection present in front of a vehicle proceeding in a first direction on a first road, a first another vehicle proceeding in a second direction opposite to the first direction on the first road to approach the intersection, and a second another vehicle traveling after the first another vehicle, controls the vehicle based on a first relative relation between the first another vehicle and the vehicle and a second relative relation between the second another vehicle and the vehicle, determines, when the first and second another vehicles are expected to enter the second road, whether the vehicle enters the second road after the first another vehicle and before the second another vehicle or after the second another vehicle based on relative relations between a basis position and the vehicle, the first and second another vehicles, and controls the vehicle based on a determining result.

20 Claims, 13 Drawing Sheets

(52) U.S. Cl.
CPC . *B60W 2554/803* (2020.02); *B60W 2554/804* (2020.02)

(56) References Cited

U.S. PATENT DOCUMENTS

| | | | |
|---|---|---|---|
| 2019/0308625 A1* | 10/2019 | Iimura | B60W 60/0011 |
| 2020/0026284 A1* | 1/2020 | Hiramatsu | G01C 21/36 |
| 2020/0211370 A1* | 7/2020 | Chen | G01C 21/3885 |
| 2020/0211377 A1* | 7/2020 | Chen | G08G 1/0133 |
| 2021/0263165 A1* | 8/2021 | Zheng | G01S 19/04 |
| 2021/0302570 A1* | 9/2021 | Ichiki | G01S 13/865 |
| 2021/0387622 A1* | 12/2021 | Kudo | B60W 30/16 |

* cited by examiner

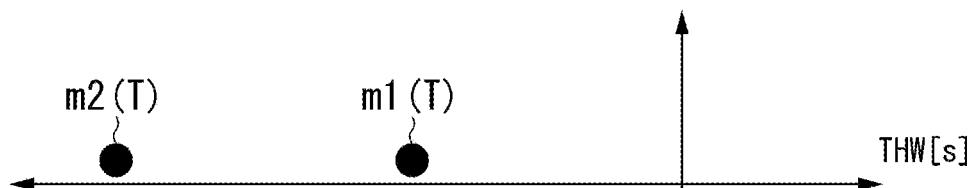
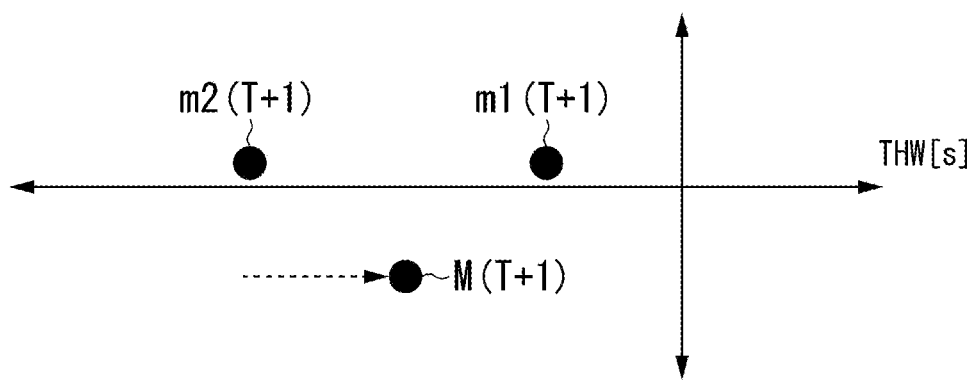
FIG. 5

VEHICLE CONTROL DEVICE, VEHICLE CONTROL METHOD, AND NON-TRANSITORY COMPUTER READABLE STORAGE MEDIUM

CROSS-REFERENCE TO RELATED APPLICATION

This application claims the priority benefit of Japan application serial no. 2020-180327, filed on Oct. 28, 2020. The entirety of the above-mentioned patent application is hereby incorporated by reference herein and made a part of this specification.

BACKGROUND

Technical Field

The disclosure relates to a vehicle control device, a vehicle control method, and a non-transitory computer readable storage medium.

Description of Related Art

A conventional technology (see Patent Document 1, for example) has disclosed to detect, for at least two or more moving objects existing in the traveling direction on the track of an own vehicle, the external environment before the track of a first moving object firstly intersecting with the own vehicle track intersects with the vehicle, calculate, in the case where two moving objects, i.e., the first moving object and a second moving object on a track whose position of intersecting with the track of the own vehicle is more distant from the position where the track of the first moving object intersects with the track of the own vehicle, are detected, a first intersection time of arriving at a first intersection position where a predicted track of the own vehicle intersects with a predicted track of the first moving object and a second intersection time of arriving at a second intersection position where the predicted track of the own vehicle intersects with a predicted track of the second moving object, and change decelerations with respect to the first moving object and the second moving object in accordance with a difference between the second intersection time and the first intersection time.

PRIOR ART DOCUMENT

Patent Document

Patent Document 1: Japanese Laid-open No. 2015-170233

However, in the above technology, there is a case where vehicle control with which the occupant is comfortable cannot be realized.

SUMMARY

A vehicle control device, a vehicle control method, and a non-transitory computer readable storage medium according to the disclosure adopt a configuration as follows.

A vehicle control device according to an aspect of the disclosure includes: a recognition part, recognizing an intersection present in front of a vehicle proceeding in a first direction on a first road, a first another vehicle proceeding in a second direction opposite to the first direction on the first road to approach the intersection, and a second another vehicle traveling after the first another vehicle; a first processing part, in a case where the vehicle is expected to enter a second road differing from the first road and connected to the intersection, controlling the vehicle based on a first relative relation between a position and a velocity of the first another vehicle and a position and a velocity of the vehicle and a second relative relation between a position and a velocity of the second another vehicle and the position and the velocity of the vehicle; a determining part, in a case where the first processing part performs control, the vehicle approaches the intersection, and the first another vehicle and the second another vehicle are expected to enter the second road, determining whether the vehicle enters the second road after the first another vehicle and before the second another vehicle or enters the second road after the second another vehicle based on a relative relation between a basis position set at the intersection or in a vicinity of the intersection and the velocity and the position of the vehicle, a relative relation between the basis position and the velocity and the position of the first another vehicle, and a relative relation between the basis position and the velocity and the position of the second another vehicle; and a second processing part, controlling the vehicle based on a result of a determination of the determining part.

A vehicle control method according to an aspect of the disclosure includes: by a computer, recognizing an intersection present in front of a vehicle proceeding in a first direction on a first road, a first another vehicle proceeding in a second direction opposite to the first direction on the first road to approach the intersection, and a second another vehicle traveling after the first another vehicle; in a case where the vehicle is expected to enter a second road differing from the first road and connected to the intersection, controlling the vehicle based on a first relative relation between a position and a velocity of the first another vehicle and a position and a velocity of the vehicle and a second relative relation between a position and a velocity of the second another vehicle and the position and the velocity of the vehicle; in a case where control is performed based on the first relative relation and the second relative relation, the vehicle approaches the intersection, and the first another vehicle and the second another vehicle are expected to enter the second road, determining whether the vehicle enters the second road after the first another vehicle and before the second another vehicle or enters the second road after the second another vehicle based on a relative relation between a basis position set in front of the intersection and the velocity and the position of the vehicle, a relative relation between the basis position and the velocity and the position of the first another vehicle, and a relative relation between the basis position and the velocity and the position of the second another vehicle; and controlling the vehicle based on a result of a determination.

A non-transitory computer readable storage medium according to an aspect of the disclosure stores a program. The program causes a computer to: recognize an intersection present in front of a vehicle proceeding in a first direction on a first road, a first another vehicle proceeding in a second direction opposite to the first direction on the first road to approach the intersection, and a second another vehicle traveling after the first another vehicle; in a case where the vehicle is expected to enter a second road differing from the first road and connected to the intersection, control the vehicle based on a first relative relation between a position and a velocity of the first another vehicle and a position and a velocity of the vehicle and a second relative relation between a position and a velocity of the second another vehicle and the position and the velocity of the vehicle; in a case where control is performed based on the first relative relation and the second relative relation, the vehicle approaches the intersection, and the first another vehicle and the second another vehicle are expected to enter the second road, determine whether the vehicle enters the second road after the first another vehicle and before the second another vehicle or enters the second road after the second another vehicle based on a relative relation between a basis position set in front of the intersection and the velocity and the position of the vehicle, a relative relation between the basis position and the velocity and the position of the first another vehicle, and a relative relation between the basis position and the velocity and the position of the second another vehicle; and control the vehicle based on a result of a determination.

BRIEF DESCRIPTION OF THE DRAWINGS

FIG. 5 is a diagram illustrating a change of THW before and after a first process.

DESCRIPTION OF THE EMBODIMENTS

Figure 1:
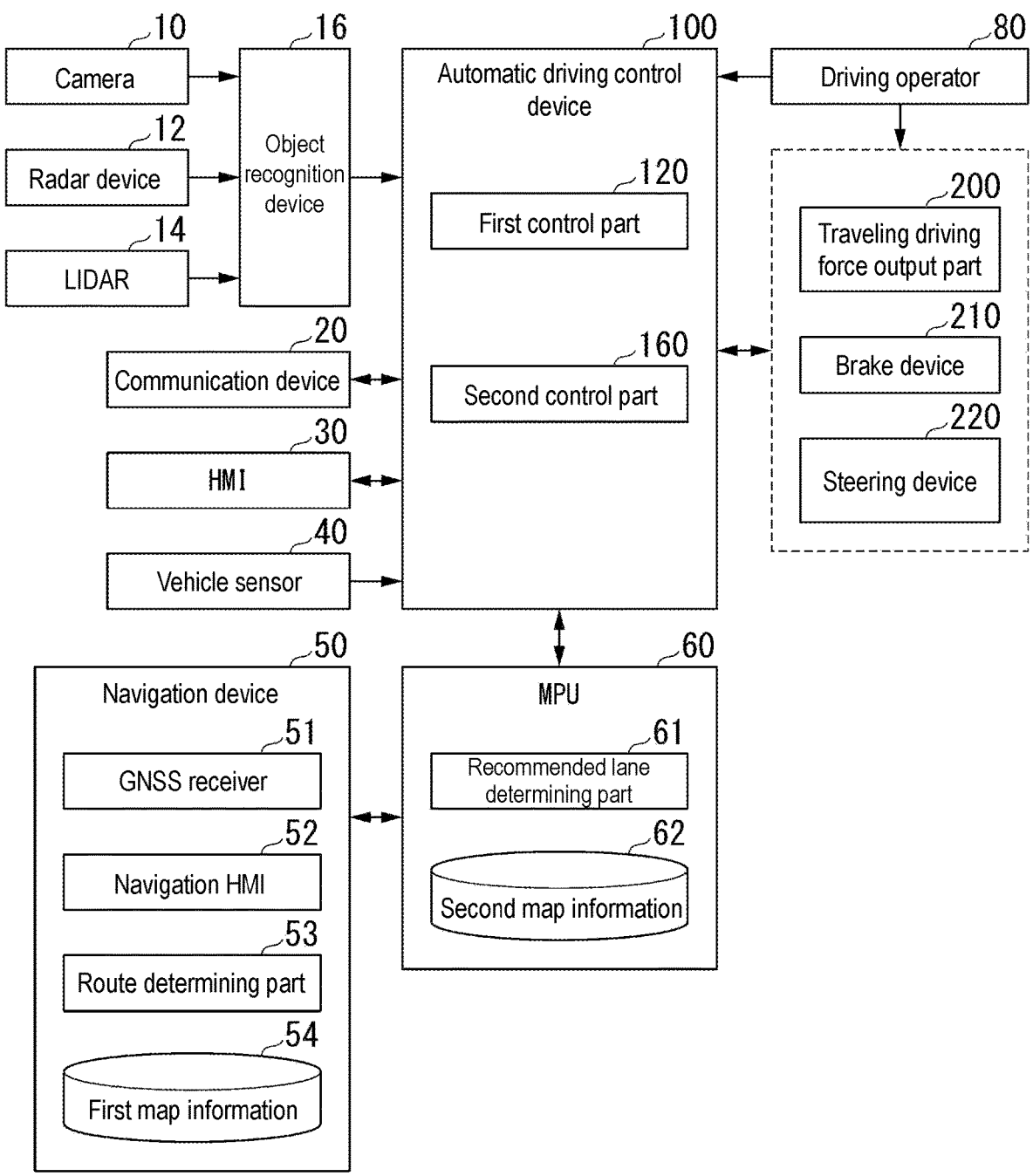
FIG. 1 is a diagram illustrating a configuration of a vehicle system 1 using a vehicle control device according to an embodiment.

The disclosure provides a vehicle control device, a vehicle control method, and a non-transitory computer readable storage medium capable of realizing vehicle control with which the occupant is comfortable.

According to an embodiment of the disclosure, the first process part performs a first process based on a first index obtained by dividing a distance relating to a traveling direction from the vehicle to the first another vehicle by a velocity difference between the vehicle and the first another vehicle and a second index obtained by dividing a distance relating to the traveling direction from the vehicle to the second another vehicle by a velocity difference between the vehicle and the second another vehicle.

According to an embodiment of the disclosure the first processing part executes the first process so that a third index is set between the first index and the second index, and the third index is an index obtained by dividing a distance relating to the traveling direction from a hypothetical vehicle set between the position of the first another vehicle and the position of the second another vehicle to the vehicle by a velocity obtained based on the velocity of the first another vehicle and the velocity of the second another vehicle.

According to an embodiment of the disclosure, the determining part determines whether the vehicle enters the second road after the first another vehicle and before the second another vehicle or enters the second road after the second another vehicle based on a fourth index obtained by dividing a distance from the vehicle to the basis position by the velocity of the vehicle, a fifth index obtained by dividing a distance from the first another vehicle to the basis position by the velocity of the first another vehicle, and a sixth index obtained by dividing a distance from the second another vehicle to the basis position by the velocity of the second another vehicle.

According to an embodiment of the disclosure, the determining part determines whether the vehicle enters the second road after the first another vehicle and before the second another vehicle based on a first comparison result obtained by comparing the fourth index, the fifth index, and a first threshold and a second comparison result obtained by comparing the fourth index, the sixth index, and a second threshold.

According to an embodiment of the disclosure, the determining part determines that the vehicle enters the second road after the second another vehicle in a case where the determining part determines that the vehicle does not enter the second road after the first another vehicle and before the second another vehicle.

According to an embodiment of the disclosure, the second processing part causes the vehicle to follow the first another vehicle in a case where the determining part determines that the vehicle enters the second road after the first another vehicle and before the second another vehicle, and causes the vehicle to follow the second another vehicle in a case where the determining part determines that the vehicle enters the second road after the second another vehicle.

According to an embodiment of the disclosure, the first road at least includes a first lane, a second lane, and a third lane, the first lane is a lane in which the vehicle travels, the second lane is a lane which is provided between the first lane and the third lane, in which a third vehicle travels in the first direction, and in which the third vehicle is prohibited from entering the second road from the second lane, the third lane is a lane which allows the first another vehicle and the second another lane traveling in the third lane to enter the second road from the third lane, and the first processing part controls the vehicle based on the first relative relation and the second relative relation in a case where a vehicle traveling in the second lane on a periphery of the vehicle is not present.

According to an embodiment of the disclosure, the first road at least includes a first lane, a second lane, and a third lane, the first lane is a lane in which the vehicle travels, the second lane is a lane which is provided between the first lane and the third lane, in which a third vehicle travels in the second direction, and in which the third vehicle is prohibited from entering the second road from the second lane, the third lane is a lane which allows the first another vehicle and the second another lane traveling in the third lane to enter the second road from the third lane, and the first processing part controls the vehicle based on the first relative relation and the second relative relation in a case where a vehicle traveling in the second lane on a periphery of the first another vehicle and the second another vehicle is not present.

According to one or some embodiments of the disclosure, the vehicle control device is capable of realizing vehicle control with which the occupant is comfortable.

According to one or some embodiments of the disclosure, at the time of entering the second road or after entering the second road, the vehicle control device follows the preceding vehicle. Therefore, the processing load is reduced.

Hereinafter, the embodiments of a vehicle control device, a vehicle control method, and a program of the disclosure will be described with reference to the drawings. While a vehicle M is described with a rule of traveling on the left side, in the case with a rule of traveling on the right side, the right side and the left side may be read as appropriate based on the rule.

[Overall Configuration]

FIG. 1 is a diagram illustrating a configuration of a vehicle system 1 using a vehicle control device according to an embodiment. A vehicle where the vehicle system 1 is mounted is a two-wheel, three-wheel, four-wheel, etc., vehicle, for example, and the drive source thereof is an internal combustion mechanism such as a diesel engine, a gasoline engine, etc., an electric motor, or a combination thereof. The electric motor operates by using power generated by a power generator connected with the internal combustion mechanism or power discharged by a fuel cell or a secondary battery.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driving operator 80, an automatic driving control device 100, a traveling driving force output device 200, a brake device 210, and a steering device 220. These devices or machines are connected with each other by multiple communication cables such as controller area network (CAN) communication cables, serial communication cables, a wireless communication network etc. It should be noted that the configuration shown in FIG. 1 merely serves as an example. A portion of the configuration may be omitted, and other configurations may also be further added.

The camera 10, for example, is a digital camera using a solid-state image capturing device such as a charge coupled device (CCD), a complementary metal oxide semiconductor (CMOS). The camera 10 may be attached to any place of the vehicle (vehicle M in the following) where the vehicle system 1 is mounted. In the case of capturing an image of the front, the camera 10 is attached to the upper part of the front windshield or the inner side of a rearview mirror. The camera 10, for example, periodically and repetitively captures images of the periphery of the vehicle M. The camera 10 may also be a stereo camera.

The radar device 12 radiates radio waves such as millimeter waves to the periphery of the vehicle M and at least detects a position (distance and orientation) of an object by detecting radio waves (reflected waves) reflected by the object. The radar 12 may be attached to any place of the vehicle M. The radar device 12 may also detect the position and the velocity of the object by using frequency modulated continuous wave (FW-CW).

The LIDAR 14 radiates light (or electromagnetic waves whose wavelengths are close to light) to the periphery of the vehicle M and measures scattered light. The LIDAR 14 detects the distance to an object based on the time from light emission until light reception. The radiated light is, for example, pulse-like laser light. The LIDAR 14 may be attached to any place of the vehicle M.

The object recognition device 16 performs a sensor fusion process according to some or all of the camera 10, the radar device 12, and the LIDAR 14 to recognize the position, the type, and the velocity of the object. The object recognition device 16 outputs the recognition result to the automatic driving control device 100. The object recognition device 16 may also output the detection results of the camera 10, the radar 12, and the LIDAR 14 directly to the automatic driving control device 100. The vehicle system 1 may also omit the object recognition device 16.

The communication device 20 uses a cellular network, a Wi-Fi network, Bluetooth (registered trademark), dedicated short range communication (DSRC), etc., to communicate with other vehicles present around the periphery of the vehicle M, or communicates with various server devices via a wireless base station.

The HMI 30 notifies the occupant of the vehicle M with various information as well as receiving an input operation of the occupant. The HMI 30 includes various display devices, speakers, buzzers, touch panels, switches, keys, etc.

The vehicle sensor 40 includes a vehicle velocity sensor detecting the velocity of the vehicle M, an acceleration sensor detecting acceleration, a yaw rate sensor detecting the angular velocity around the vertical axis, and an orientation sensor detecting the orientation of the vehicle M, etc.

The navigation device 50 includes, for example, a global navigation satellite system (GNSS) receiver 51, a navigation HMI 52, and a route determining part 53. The navigation device 50 keeps a first map information 54 in a storage device such as a hard disk drive (HDD), a flash memory, etc. The GNSS receiver 51 specifies the position of the vehicle M based on signals received from a GNSS satellite. The position of the vehicle M may also be specified or complemented by an inertial navigation system (INS) using the output of the vehicle sensor 40. The navigation HMI 52 includes a display device, a speaker, a touch panel, a key, etc. The navigation HMI 52 may be partially or entirely shared with the HMI 30. The route determining part 53 refers to the first map information 54 to determine a route (referred to as a route on the map in the following) from the position of the vehicle M specified by the GNSS receiver 51 to the destination input by the occupant by using the navigation HMI 52. The first map information 54, for example, is information in which a road shape is expressed by a link indicating a road and nodes connected by the link. The first map information 54 may also include a road curvature or point of interest (POI) information, etc. The route on the map is output to the MPU 60. The navigation device 50 may also provide road guidance using the navigation HMI 52 based on the route on the map. The navigation device 50, for example, may also be realized by the function of a terminal device such as a smart phone, a tablet terminal, etc., possessed by the occupant. The navigation device 50 may also transmit the current position and the destination to a navigation server via the communication device 20 and obtain a route equivalent to the route on the map from the navigation server.

The MPU 60, for example, a recommended lane determining part 61, and keeps a second map information 62 in a storage device such as a hard disk drive (HDD), a flash memory, etc. The recommended lane determining part 61 divides the route on the map provided by the navigation device 50 into multiple blocks (e.g., making a division every 100 m regarding the vehicle traveling direction), and refers to the second map information 62 to determine a recommended lane for each block. The recommended lane determining part 61 makes a determination regarding which lane from the left to travel. In the case where there is a branch point on the route on the map, the recommended lane determining part 61 determines the recommended lane so that the vehicle M can travel on a reasonable route to proceed to a branch destination.

The second map information 62 is map information with a precision higher than the first map information 54. The second map information 62, for example, includes lane center information or lane boundary information etc. In addition, the second map information 62 may also include road information, traffic regulation information, address information (address, zip code), facility information, telephone number information etc. The second map information 62 may also be updated at any time through communication of the communication device 20 with other devices. The second map information 62 stores information indicating the position and the range of a zebra zone (buffer zone). The zebra zone is a road marking for guiding the traveling of the vehicle. The zebra zone is, for example, a marking represented by a strip-like pattern.

The driving operator 80, for example, includes an accelerator pedal, a brake pedal, a shift lever, a steering wheel, an odd-shaped steer, a joystick, other operators. A sensor detecting the operation amount and whether there is an operation is attached to the driving operator 80, and the detection result of the sensor is output to the automatic driving control device 100 or some or all of the traveling driving force output device 200, the brake device 210, and the steering device 220.

The automatic driving control device 100 includes, for example, a first control part 120 and a second control part 160. The first control part 120 and the second control part 160 are respectively realized by executing a program (software) by a hardware processor such as a central processing unit (CPU). In addition, one or some of the forming components may also be realized by hardware (a circuit part, including a circuitry) such as a large scale integration (LSI) or an application specific integrated circuit (ASIC), a field-programmable gate array (FPGA), a graphics processing unit (GPU), and may also be realized through cooperation between software and hardware. The program may be stored in advance in a storage device (storage device including a non-transient storage medium) such as an HDD or a flash memory of the automatic driving control device 100, and may also be installed to the HDD or the flash memory of the automatic driving control device 100 by being stored in a detachable storage medium such as a DVD or a CD-ROM and attaching the storage medium (non-transient storage medium) to a drive device. The automatic driving control device 100 is an example of "vehicle control device".

Figure 2:
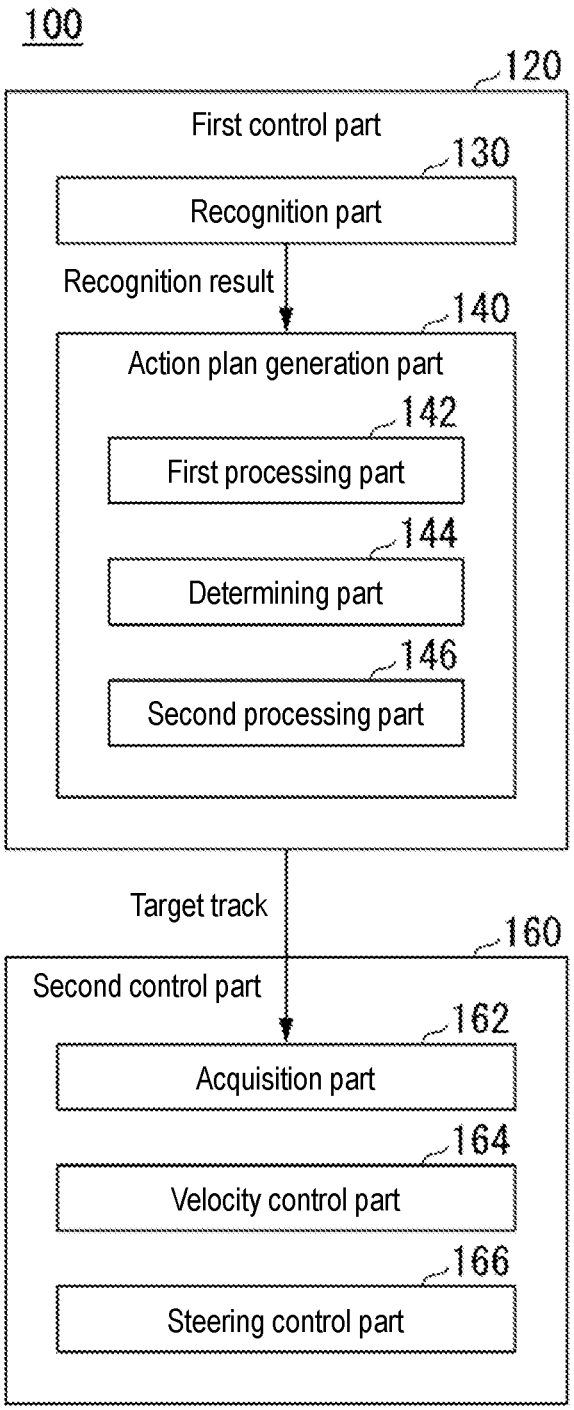
FIG. 2 is a diagram illustrating functions of a first control part 120 and a second control part 160.

FIG. 2 is a diagram illustrating functions of the first control part 120 and the second control part 160. The first control part 120, for example, includes a recognition part 130 and an action plan generation part 140. The first control part 120, for example, realizes a function by artificial intelligence (AI) and a function by a model provided in advance in parallel. For example, the function of "recognizing an intersection" may be executed by performing recognition of an intersection by deep learning and recognition based on a predetermined condition (signal-matching signals capable of pattern-matching, road markings, etc.) in parallel, rating both recognitions and giving a comprehensive evaluation. Accordingly, the reliability of the automatic driving is ensured.

The recognition part 130 recognizes the position, the velocity, and the acceleration of the object around the periphery of the vehicle M based on the information input from the radar device 12 and the LIDAR 14 via the object recognition device 16. The position of the object, for example, is recognized at a position on absolute coordinates by setting a representative point (gravity center, drive shaft center, etc.) of the vehicle M as the origin and is used for control. The position of the object may be represented as a representative point such as the gravity center or the corner of the object, and may also be represented in a represented region. The "state" of an object may include the acceleration or jerk of the object, or the "action state" (e.g., whether the vehicle is changing a lane or is about to change a lane).

The recognition part 130, for example, recognizes a lane (traveling lane) in which the vehicle M is traveling. For example, the recognition part 130 recognizes the traveling lane by comparing the pattern (e.g., arrangement of solid and broken lines) of the road compartment lines obtained from the second map information 62 and the pattern of the road compartment lines in the periphery of the vehicle M recognized from the image captured by the camera 10. The recognition part 130 may also recognize the traveling lane by recognizing a traveling boundary (road boundary) including a road compartment line, a road shoulder, a curb, a median, a guide rail, etc., without being limited to recognizing the road compartment line. The position of the vehicle M obtained from the navigation device 50 and the processing result by INS may also be incorporated into such recognition. In addition, the recognition part 130 recognizes a stop line, an obstacle, a red light, a toll collecting station, and other road events.

When recognizing the traveling lane, the recognition part 130 recognizes the position and the posture of the vehicle M with respect to the traveling lane. The recognition part 130, for example, may also recognize, as the relative position and the posture of the vehicle M with respect to the traveling lane, the deviation of the vehicle M with respect to the reference point of the vehicle M from the lane center and the angle of the traveling direction of the vehicle M formed with respect to the line connecting the lane centers. Alternatively, the recognition part 130 may also recognize, as the relative position of the vehicle M with respect to the traveling lane, the position of the reference point of the vehicle M with respect to either side end (the road compartment line or the road boundary) of the traveling lane, etc. The recognition part 130 recognizes an intersection present ahead of the vehicle proceeding in a first direction on a first road and one or more another vehicles (first another vehicle and second another vehicle) traveling in a second direction opposite to the first direction on the first road and approaching the intersection (details will be described in the following).

The action plan generation part 140 generates a target track along which the vehicle M will automatically travel (without depending on the operation of the driver) so that the vehicle M generally travels on the recommended lane determined by the recommended lane determining part 61, so as to be able to cope with the situation in the periphery of the vehicle M. The target track, for example, includes a velocity component. For example, the target track is represented as points (track points) at which the vehicle M should arrive and which are arranged one after another in order. The track point is a point at which the vehicle M should arrive for each predetermined traveling distance (e.g., at the level of several meters (m)) in the road distance, and, different thereto, a target velocity and a target acceleration for each predetermined sampling time (e.g., at the level of some tenths of a second) are generated as a part of the target track. In addition, the track point may also be the position at which the vehicle M should arrive at the sampling time for each sampling time. In such case, the information of the target velocity and the target acceleration are represented by the intervals of the track points.

The action plan generation part 140 may set an automatic driving event every time when the target track is generated. The automatic driving event includes a fixed velocity traveling event, a low velocity following traveling event, a lane changing event, a branch event, a joining event, a takeover event, etc. The action plan generation part 140 generates the target track in accordance with an activated event.

The action plan generation part 140 includes, for example, a first processing part 142, a determining part 144, and a second processing part 146. In the case where the vehicle M is expected to enter a second road differing from the first road and connected to the intersection, the first processing part 142 controls the vehicle M based on a first relative relation between the position and the velocity of the first another vehicle and the position and the velocity of the vehicle M and a second relative relation between the position and the velocity of the second another vehicle and the position and the velocity of the vehicle M.

In the case where the first processing part 142 performs control, the vehicle M approaches the intersection, and the first another vehicle and the second another vehicle are expected to enter the second road, the determining part 144 determines whether the vehicle M enters the second road after the first another vehicle and before the second another vehicle or enters the second road after the second another vehicle based on the relative relation between a basis position (reference position) set at the intersection or the vicinity of the intersection and the velocity and the position of the vehicle, the relative relation between the basis position and the velocity and the position of the first another vehicle, and the relative relation between the basis position and the velocity and the position of the second another vehicle. The second processing part 146 controls the vehicle M based on the determining result of the determining part 144. Details of the processes of the first processing part 142, the determining part 144, and the second processing part 146 will be described in the following.

The second control part 160 controls the traveling driving force output part 200, the brake device 210, and the steering device 220, so that the vehicle M passes through the target track generated by the action plan generation part 140 at the expected time.

The second control part 160, for example, includes an acquisition part 162, the velocity control part 164, and a steering control part 166. The acquisition part 162 obtains the information of the target track (track points) generated by the action plan generation part 140 and stores the information in a memory (not shown). The velocity control part 164 controls the traveling driving force output device 200 or the brake device 210 based on the velocity component associated with the target track stored in the memory. The steering control part 166 controls the steering device 220 in accordance with the curvature degree of the target track stored in the memory. The processes of the velocity control part 164 and the steering control part 166 are realized by combining feed-forward control and feedback control, for example. As an example, the steering control part 166 combines and executes the feed-forward control in accordance with the curvature of the road ahead of the vehicle M and the feedback control based on the deviation from the target track.

Referring to FIG. 1 again, the traveling driving force output device 200 outputs a traveling driving force (torque) for traveling of the vehicle to a driving wheel. The traveling driving force output device 200, for example, includes a combination of an internal combustion mechanism, an electric motor, and a transmission, etc., and an electronic control unit (ECU) controlling the combination. The ECU controls the above configuration in accordance with the information input from the second control part 160 or the information input from the driving operator 80.

The brake device 210 includes for example, a brake caliper, a cylinder transmitting a hydraulic pressure to the brake caliper, an electric motor generating the hydraulic pressure in the cylinder, and a brake ECU. The brake ECU controls the electric motor in accordance with the information input from the second control part 160 or the information input from the driving operator 80, so as to output a brake torque in accordance with the brake operation to each wheel. The brake device 210 may also include, as a back-up, a mechanism which transmits a hydraulic pressure generated in accordance with an operation on a brake pedal included in the driving operator 80 to the cylinder via a master cylinder. It should be noted that the brake device 210 is not limited to the above configuration, but may also be an electronically controlled hydraulic pressure brake device which controls an actuator in accordance with the information input from the second control part 160 and transmits the hydraulic pressure of the master cylinder to the cylinder.

The steering device 220 includes, for example, a steering ECU and an electric motor. The electric motor, for example, applies a force to a rack-and-pinion mechanism to change the direction of a steering wheel. The steering ECU drives the electric motor to change the direction of the steering wheel in accordance with the information input from the second control part 160 or the information input from the driving operator 80.

[Brief Description of Process]

Figure 3:
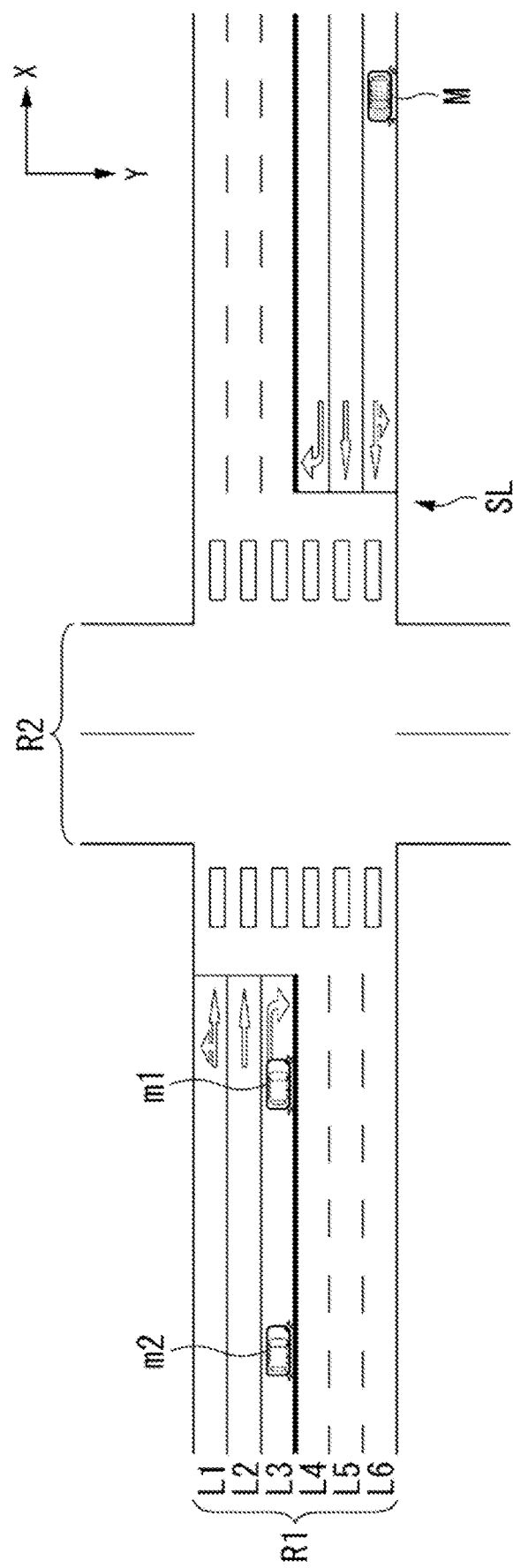
FIG. 3 is a (first) view schematically describing a process of the embodiment.
Figure 4:
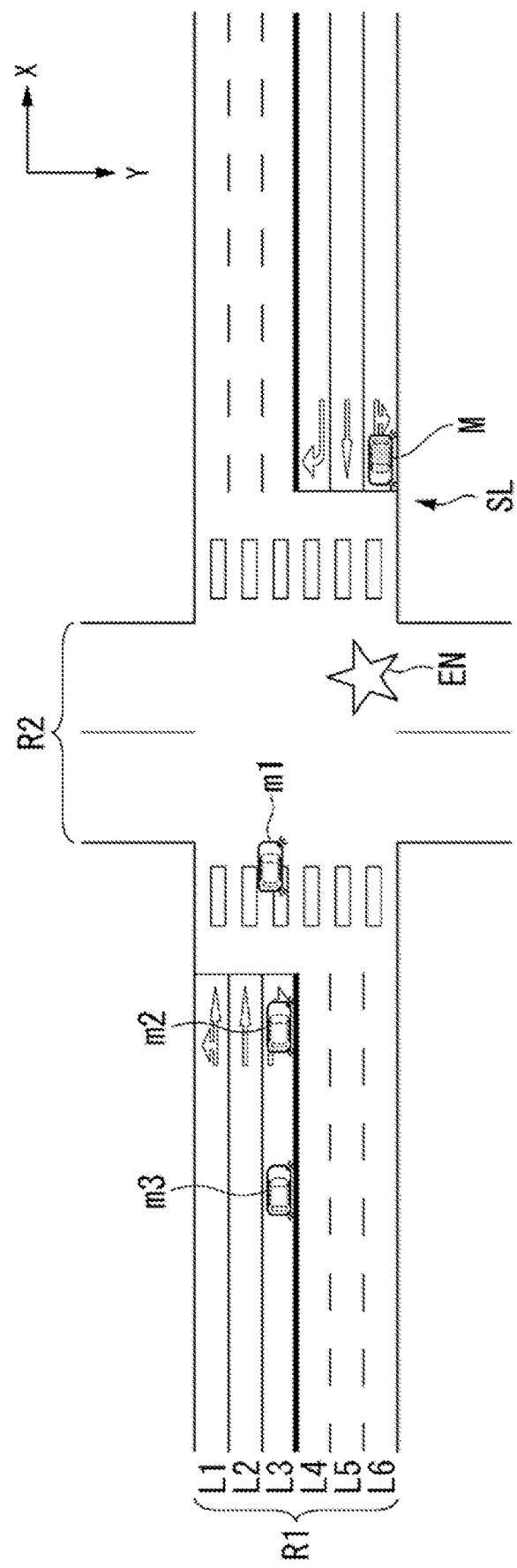
FIG. 4 is a (second) view schematically describing a process of the embodiment.

Referring to FIGS. 3 and 4, a process in which the vehicle M of the embodiment enters an intersection and turns left is briefly described. Details of each process will be described afterwards. As shown in FIG. 3, an intersection is present between a road R1 and a road R2. The road R1 includes lanes L1 to L6. The lanes L1 to L3 are lanes in which a vehicle travels from the −X direction to the +X direction (i.e., second direction), and the lanes L4 to L6 are lanes in which a vehicle travels from the +X direction to the −X direction (i.e., first direction). The vehicle M is traveling in the lane L6. The lane L6 is a lane for a vehicle traveling directly on the road R1 or for a vehicle turning left from the road R1 to enter the road R2 at the intersection to travel. Another vehicle m1 and another vehicle m2 are traveling in the lane L3. The lane L3 is a lane for a vehicle turning right from the road R1 to enter the road R2 at the intersection to travel.

The lane L6 is an example of "a first lane in which the vehicle travels". The lane L5 is an example of "a lane which is provided between the first lane and the third lane, in which a third vehicle travels in the first direction, and in which the third vehicle is prohibited from entering the second road from the second lane". The lane L3 is an example of "a third lane which allows the first another vehicle and the second another lane traveling in the third lane to enter the second road from the third lane".

The recognition part 130 is set to recognize the intersection and the another vehicle m1 and the another vehicle m2 traveling in the lane L3 or possibly traveling in the lane L3 at a predetermined distance from a stop line SL in front of the intersection. At this time, the vehicle M is expected to turn left in order to enter the second road R2. In such case, the first processing part 142 performs vehicle control (first process) based on a first relative relation between the position and the velocity of the another vehicle m1 and the position and the velocity of the vehicle m and a second relative relation between the position and the velocity of the another vehicle m2 and the position and the velocity of the vehicle M. At this time, vehicles away from the intersection by a predetermined degree or more may be excluded from the first another vehicle and the second another vehicle.

In the case where there is no vehicle traveling in the lane L5 (second lane) in the periphery of the vehicle M, the first processing part 142 may also control the vehicle M based on the first relative relation and the second relative relation, whereas in the case where a vehicle traveling in the lane L5 in the periphery of the vehicle M is present (i.e., the case where a vehicle which affects the behavior of the first another vehicle m1 or the second another vehicle m2 at the time when the first another vehicle m1 or the second another vehicle m2 enters the second road is present), the first processing part 142 may not control the vehicle M based on the first relative relation and the second relative relation. That is, in the case where a vehicle traveling in the lane L5 and the first another vehicle m1 or the second another vehicle m2 stops or drives slowly due to traveling of such vehicle, the control based on the first relative relation and the second relative relation is not executed.

In the case where the first process is performed and the vehicle M is near the intersection, the determining part 144 determines whether the vehicle M enters the second road R2 before the another vehicle m1, enters the second road R2 after the another vehicle m1 and before the another vehicle m2, enters the second road R2 after the another vehicle m2 and before another vehicle m3, or enters the second road R2 after the another vehicle m3 based on a reference position EN set in front of the intersection, the velocity and the position of the vehicle M, the velocity and the position of the another vehicle m1, and the velocity and the position of the another vehicle m2. The second processing part 146 controls the vehicle M (executes a second process) based on the determining result of the determining part 144. The reference position EN, for example, is a region in the intersection through which the vehicle M and the another vehicles (another vehicles m2 and m3) commonly pass. The reference position EN, for example, is a position based on the position where the lane L3 of the first road, the vehicle M of the road R2, and the lanes in which another vehicles travel intersect.

"the vehicle M is near the intersection" means that the vehicle M arrives at the stop line SL in front of the intersection, the vehicle M arrives at a predetermined position in the vicinity of the stop line SL, or the vehicle M arrives at a position where the recognition part 130 can recognize the situation in the vicinity of the intersection (the shape of the intersection), or behaviors of the another vehicles (conditions of direction indicators) at a recognition precision of a predetermined degree or more. The recognition precision of a predetermined degree or more means that the recognition certainty is equal to or greater than a predetermined degree.

[Regarding First Process]

The first process part 142 performs the first process based on a first index obtained by dividing the distance relating to the traveling direction from the vehicle M to the another vehicle M1 by the velocity difference between the vehicle M and the another vehicle m1 and a second index obtained by dividing the distance relating to the traveling direction from the vehicle M to the another vehicle m2 by the velocity difference between the vehicle M and the another vehicle m2. In the case where there is another vehicle in the lane L3 other than the another vehicle m1 and the another vehicle m2 as well, an index may be derived based on the relation between the vehicle M and the another vehicle, and the first process may be executed by using the derivation result.

The first index (TTC(m1)) and the second index (TTC (m2)) are derived based on Formula (1) in the following. (TTC(m1)) is an example of the "first relative relation", and (TTC(m2)) is an example of the "second relative relation". "x(target)" is the position of the another vehicle. "x(ego)" is the position of the vehicle M. "vx(target)" is the velocity of the another vehicle. "vx(ego)" is the velocity of the vehicle M.

$$TTC = \frac{x(\text{target}) - x(\text{ego})}{vx(\text{target}) - vx(\text{ego})} \quad (1)$$

The first processing part 142 derives TTC(m1) between the another vehicle m1 and the vehicle M and derives TTC(m2) between the another vehicle m2 and the vehicle M. The first processing part 142, for example, sets a hypothetical vehicle between (in the middle of) the another vehicle m1 and the another vehicle m2, and controls the vehicle M so that TTC(Im) between the hypothetical vehicle Im and the vehicle M becomes TTC(x) in the middle between TTC(m1) and TTC(m2). For example, by applying TTC(x), the velocity of the hypothetical vehicle Im, the position of the hypothetical vehicle Im, and the position of the vehicle M to Formula (1) above, the velocity of the vehicle M is derived. The velocity of the hypothetical vehicle Im is the averaged velocity between the velocity of the another vehicle m1 and the velocity of the another velocity m2. The velocity of the hypothetical vehicle Im may also be a velocity closer to the velocity of the another vehicle m1 or a velocity closer to the velocity of the another vehicle m2 than the averaged velocity. TTC(Im) is an example of "a third index set between the first index and the second index".

FIG. 5 is a diagram illustrating a change of THW before and after the first process. THW is an index used by the determining part 144, whereas THW will be firstly described in the following. The vertical axis of FIG. 5 represents the position of each vehicle in Y direction. The horizontal axis of FIG. 5 represents THW[s]. In the case where the position of the vehicle in Y direction is considered, the horizontal axis can be considered as a median between the lane L3 and the lane L4. In FIG. 5, the another vehicle m1 and the another vehicle m2 are positioned in the lane L3, and the vehicle M is positioned in the lane L6. THW[s] represents the time until a target vehicle arrives at the reference position EN.

THW is derived based on Formula (2) in the following. "x(car)" is the position of the target vehicle (the vehicle M, the another vehicle m1, or the another vehicle m2). "x(EN)" is the reference position EN (see FIG. 4) set in the intersection. "vx(car)" is the velocity of the target vehicle (the vehicle M, the another vehicle m1, or the another vehicle m2).

$$THW = \frac{x(\text{car}) - x(EN)}{vx(\text{car})} \quad (2)$$

For example, in the same situation as in FIG. 3, when the positions and the velocities of the another vehicle m1, the another vehicle m2, and the vehicle M at a time T before the first process is performed are applied to Formula (2) above, the upper portion of FIG. 5 is rendered. As shown in the upper portion of FIG. 5, in the case where the current state is maintained, the respective vehicles decelerate in the vicinity of the intersection to arrive at the reference position EN, after the another vehicle m1 arrives at the reference position EN, the another vehicle m2 and the vehicle M arrive at the reference position EN at the same timing or close timings.

In such state, the first process is performed. At this time (at the time of time T+1), as shown in the lower portion of FIG. 5, THW(M) in which the vehicle M is set as the target vehicle is positioned between THW(m1) in which the another vehicle m1 is set as the target vehicle and THW(m2) in which the another vehicle m2 is set as the target vehicle. That is, in the case where the situation at the time T+1 continues, after the another vehicle m1 arrives at the reference position EN and before the another vehicle m2 arrives at the reference position EN, the vehicle M can arrive at the reference position EN smoothly (without drastically accelerating or decelerating) without interfering with other vehicles. In this way, the vehicle M performs the first process before approaching the intersection and prepares for making a left turn smoothly.

While the turning (movement in Y direction) of the another vehicle m1, the another vehicle m2, and the vehicle M is not considered in the above description, if the movement in X direction is considered, the precision relating to the first process of a predetermined degree or more is ensured. If the precision is to be further increased, the movement amount of Y direction (the movement amount to the reference position EN relating to Y direction) may also be incorporated. For example, since the movement amounts of the another vehicle m1 and the another vehicle m2 in Y direction are greater than the movement amount of the vehicle M in Y direction, it is assumed that the movement times of the another vehicle m1 and the another vehicle m2 are longer than the movement time of the vehicle M, and THW(M) may be greater than THW(m1).

[Regarding Process Executed by Determining Part 144 and Second Process (First)]

Figure 6:
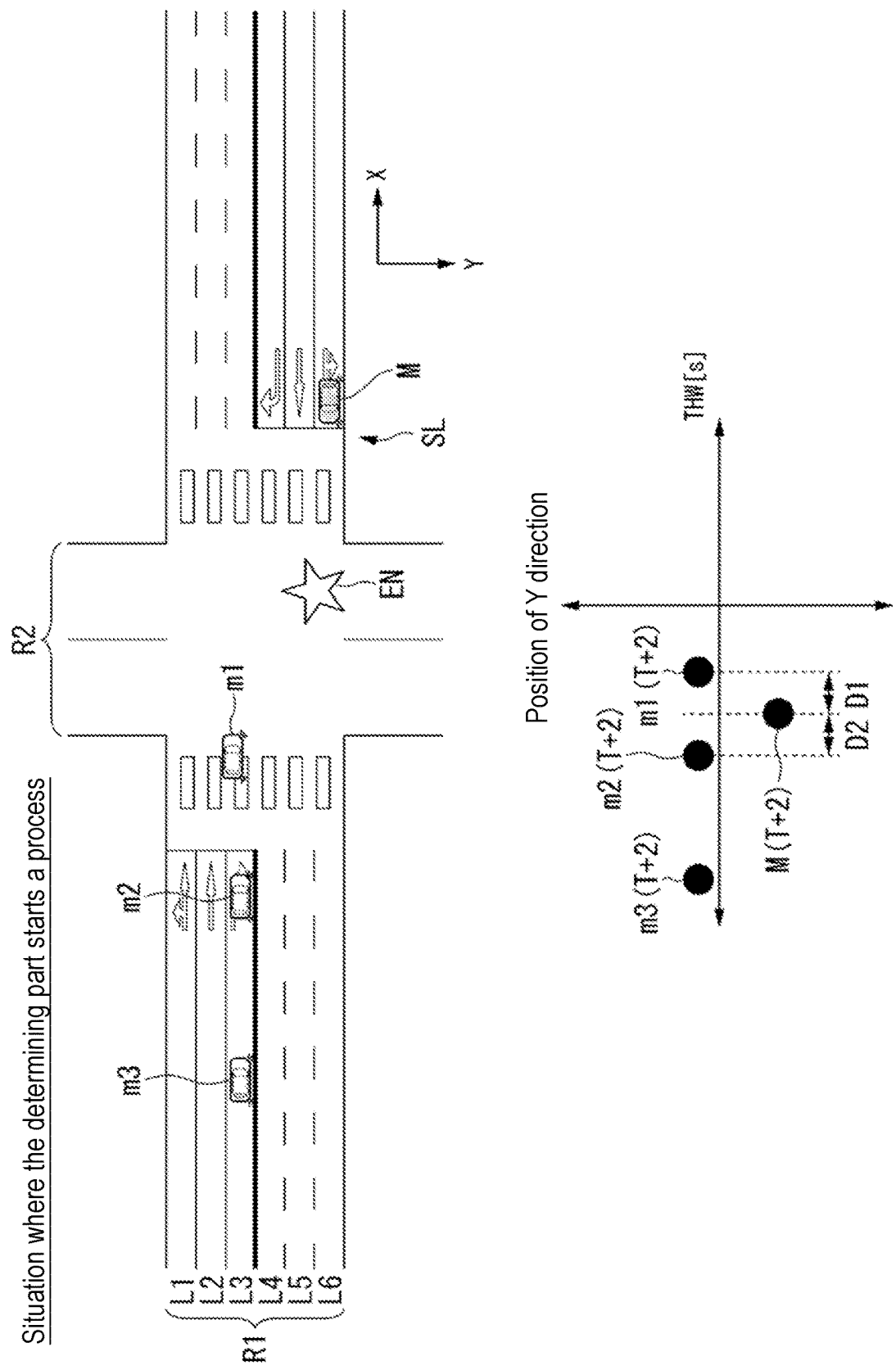
FIG. 6 is a (first) view describing a process executed by a determining part 144.

FIG. 6 is a (first) view describing a process executed by the determining part 144. As shown in the upper portion of FIG. 6, in the case where the first process is performed and the stop line SL (or the vicinity of the stop line SL) is approaching, and the first another vehicle m1 and the second another vehicle m2 are expected to enter the second road R2 (e.g., in the case of traveling in a special lane for entering the second road, or that the direction indicator indicates entry into the second road R2), the determining part 144 determines the left-turn timing based on the relative relation among the reference position EN, the vehicle M, and the another vehicle. The determining part 144 determines before or after which another vehicle the vehicle M is to be positioned when entering the second road R2. The relative relation is represented by THW[s] between the target vehicle and the reference position EN.

The lower portion of FIG. 6 illustrates THW of the state of the upper portion of FIG. 6. The determining part 144 derives the difference between THW(M) and THW(m) corresponding to another vehicle as the target regarding the THW axis. As will be described in the following, THW(M) is an example of "a fourth index obtained by dividing a distance from the vehicle to the basis position by the velocity of the vehicle", THW(m1) is an example of "a fifth index obtained by dividing a distance from the first another vehicle to the basis position by the velocity of the first another vehicle", and THW(m2) is an example of "a sixth index obtained by dividing a distance from the second another vehicle to the basis position by the velocity of the second another vehicle".

In the lower portion of FIG. 6, regarding the THW axis, a difference D1 between THW(M) and THW(m1) and a difference D2 between THW(M) and THW(m2) are set to be less than a threshold (less than a first threshold or a second threshold). In such case, the determining part 144 determines not to travel between the another vehicle m1 and the another vehicle m2 to enter the second road R2. The threshold is an index indicating a margin of the distance between the vehicle M and the another vehicle.

In the case where the vehicle M is determined as being unable to travel between the another vehicle m1 and the another vehicle m2, the determining part 144 assumes that THW(M) is set between THW(m2) and THW(m3) and determines whether the difference between THW(M) and THW(m) is equal to or greater than a threshold. In the case where the difference between THW(M) and THW(m) is equal to or greater than the threshold, the determining part determines that the vehicle M travels between the another vehicle m2 and the another vehicle m3 to enter the second road R2.

In the case of determining that the vehicle M does not travel between the another vehicle m2 and the another vehicle m3 to enter the second road R2, the determining part 144 determines that the vehicle M travels after the another vehicle m3 to enter the second road R2, for example. In addition, for example, in the case where THW(M) is less than THW(m1) by a predetermined degree or in the case where THW(M) is equal to THW(m1), the determining part 144 may also determine that the vehicle M enters the second road R2 before the another vehicle m1.

In the case where the difference between THW(M) and THW(m1) is less than the threshold and the difference between THW(M) and THW(m2) is equal to or greater than the threshold, when the difference between THW(M) and THW(m2) can be maintained to be equal to or greater than the threshold even if the difference between THW(M) and THW(m2) is reduced and the difference between THW(M) and THW(m1) can be equal to or greater than the threshold, the determining part 144 may also determine that the vehicle M travels between the another vehicle m1 and the another vehicle m2 to enter the second road R2. The second processing part 146 controls the vehicle M based on the determining result of the determining part 144.

As described above, the determining part 144 determines whether the vehicle M enters the second road R2 after the another vehicle m1 and before the another vehicle m2 based on a first comparison result comparing THW(M) and THW(m1) with the first threshold and a second comparison result comparing THW(M) and THW(m2) with the second threshold. The first threshold and the second threshold may be set to be the same or different values.

[Regarding Process Executed by Determining Part 144 and Second Process (Second)]

Figure 7:
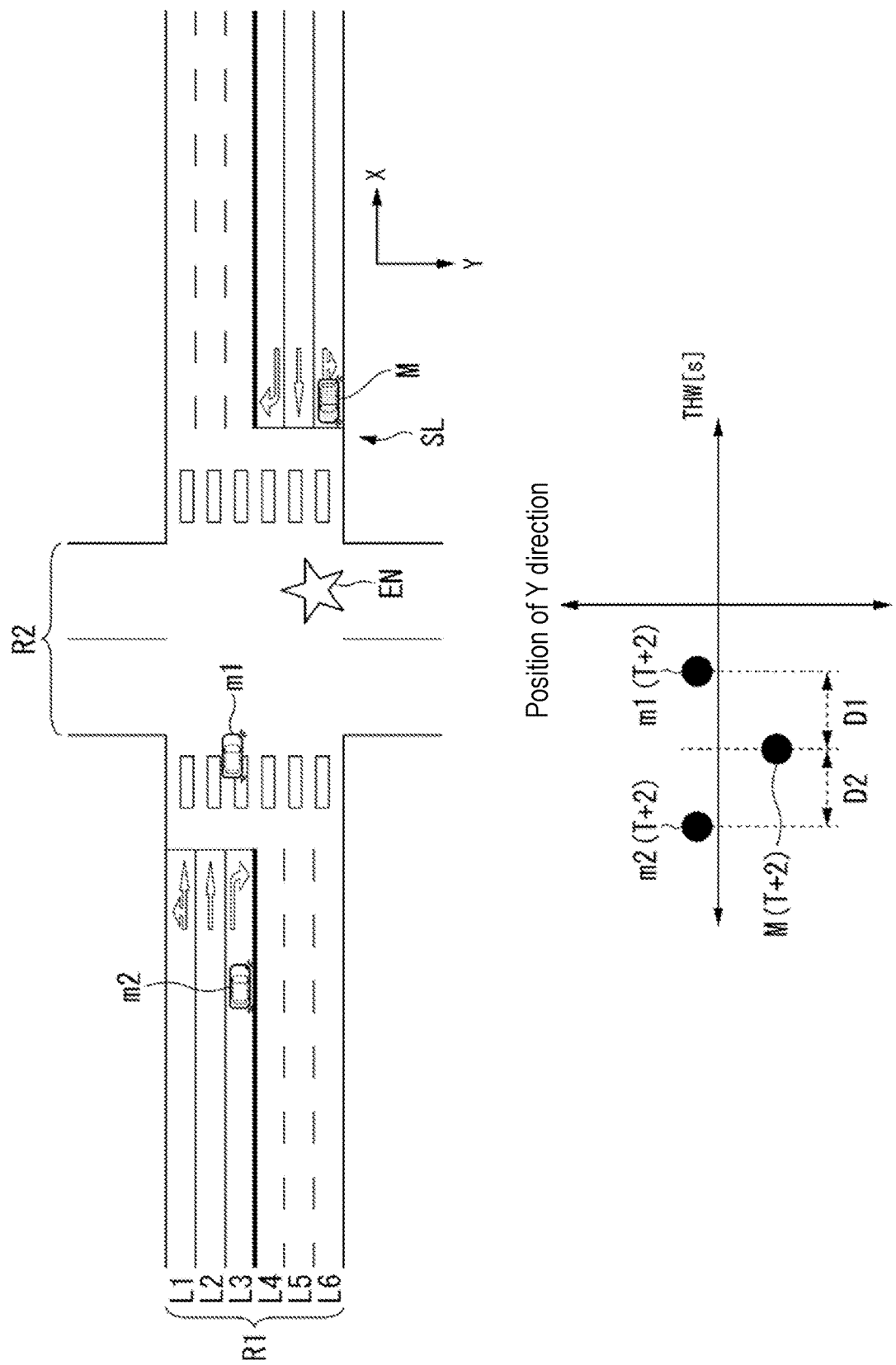
FIG. 7 is a (second) view describing a process executed by the determining part 144.

FIG. 7 is a (first) view describing a process executed by the determining part 144. The lower portion of FIG. 7 illustrates THW of the state of the upper portion of FIG. 7. In the lower portion of FIG. 7, regarding the THW axis, the difference D1 between THW(M) and THW(m1) and the difference D2 between THW(M) and THW(m2) are set to be greater than or equal to the threshold (greater than or equal to the first threshold or the second threshold). In such case, the determining part 144 determines to travel between the another vehicle m1 and the another vehicle m2 to enter the second road R2.

As described above, the determining part 144 determines that the vehicle M enters the second road R2 after the another vehicle m1 and before the another vehicle m2 or enters the second road R2 after the another vehicle m2 based on the first comparison result comparing THW(M) and THW(m1) with the first threshold and the second comparison result comparing THW(M) and THW(m2) with the second threshold.

Figure 8:
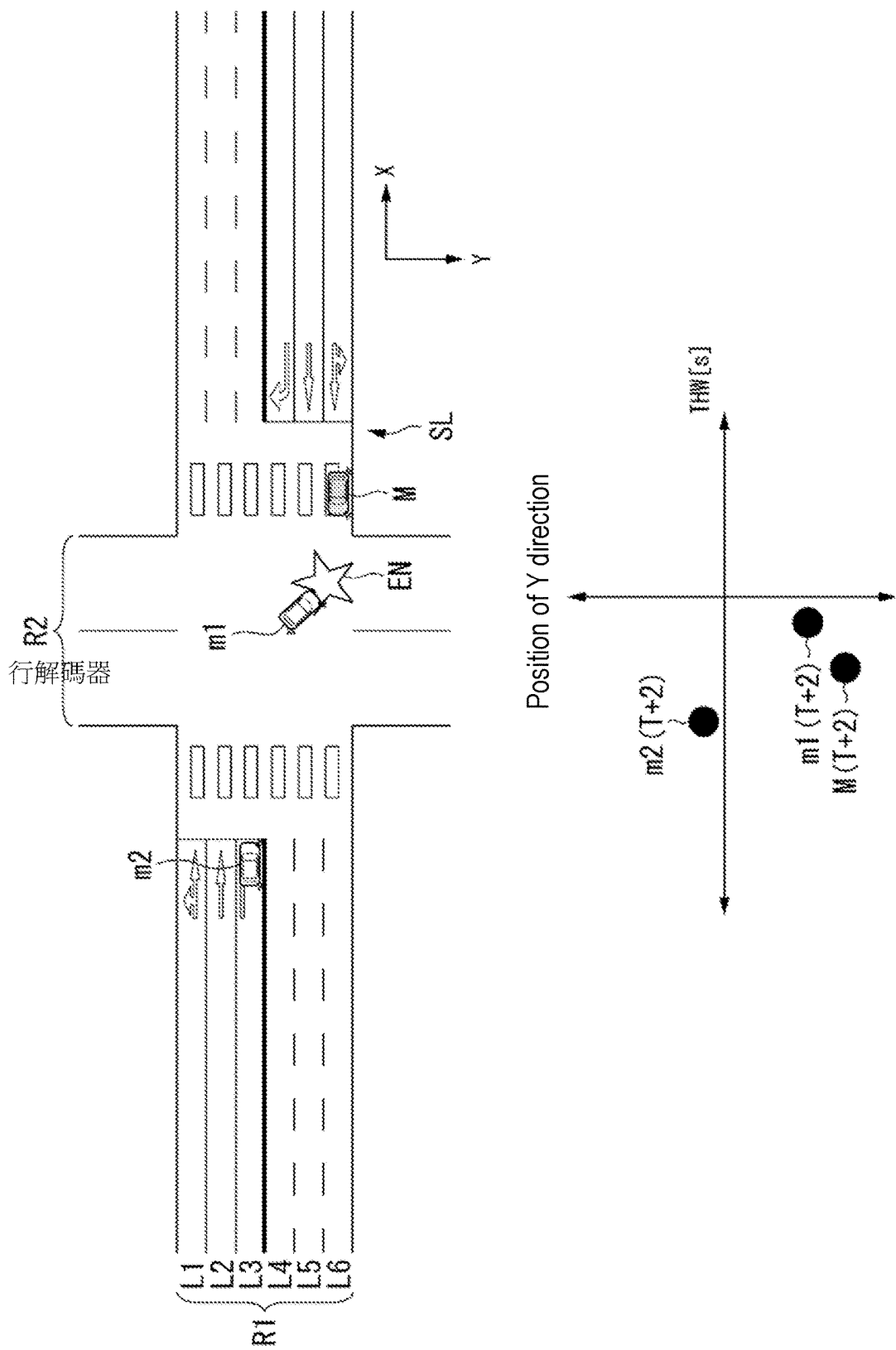
FIG. 8 is a (first) view illustrating an example of a case where a vehicle M travels after another vehicle m1 and enters a second road R2.
Figure 9:
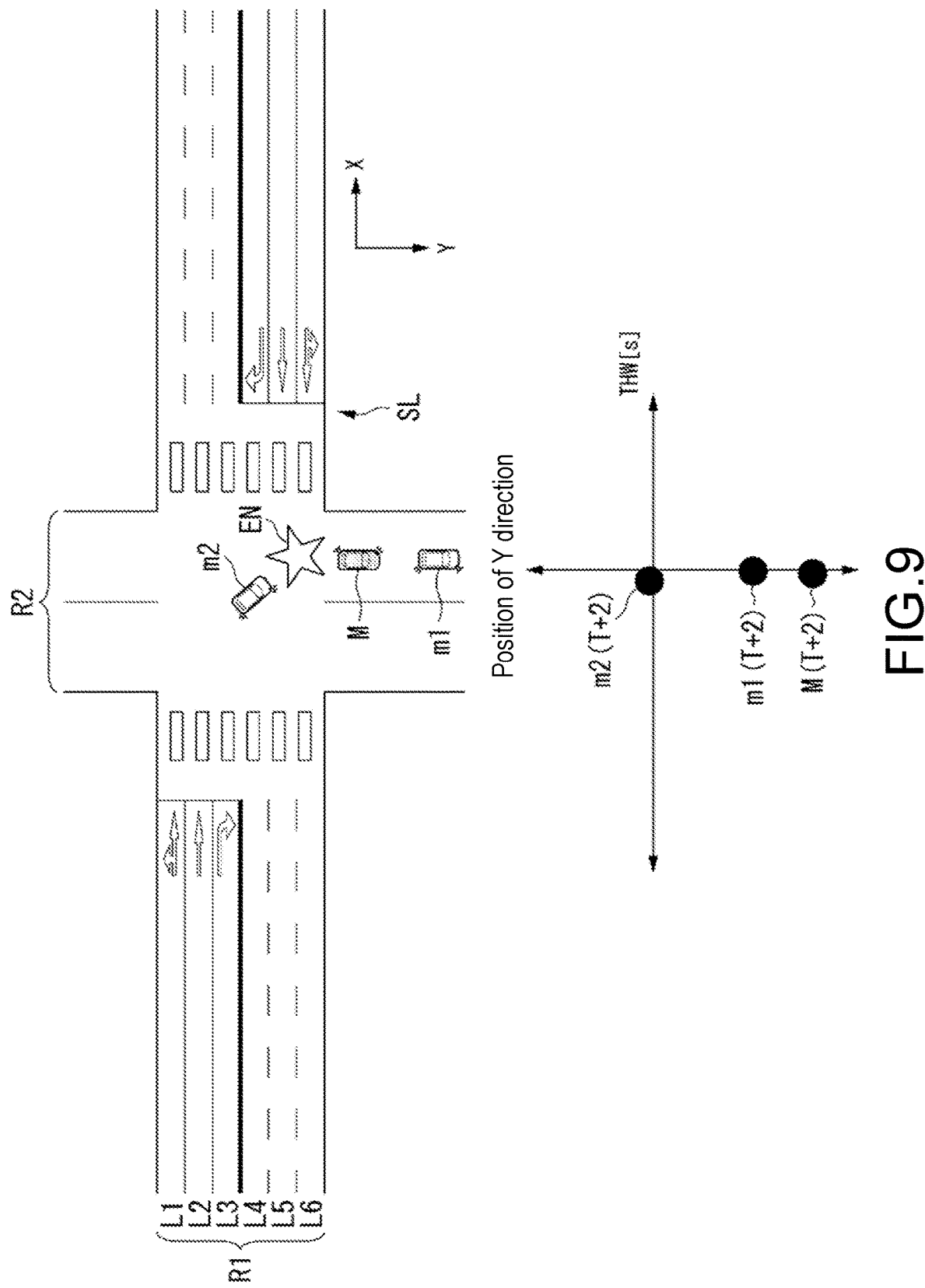
FIG. 9 is a (second) view illustrating an example of the case where the vehicle M travels after the another vehicle m1 to enter the second road R2.

FIGS. 8 and 9 are views illustrating an example of the case where the vehicle M travels after the another vehicle m1 to enter the second road R2. In the case where the determining part 144 determines that the vehicle M travels after the another vehicle m1 to enter the second road R2 as described in FIG. 7, the second processing part 146 controls the velocity and the steering of the vehicle M based on the determining result of the determining part 144 between the stop line SL and the intersection (see FIG. 8), so that the vehicle M travels after the another vehicle m1. The lower portion of FIG. 8 illustrates THW in the situation of the upper portion of FIG. 8. In addition, the second processing part 146 causes the vehicle M to enter the second road R2 after the another vehicle m1 enters the second road R2 and before the another vehicle m2 enters the second road R2 (see FIG. 9).

As shown in FIG. 9, in the case where another vehicle is present in front of the vehicle M, the second processing part 146 executes following control causing the vehicle M to follow the another vehicle. The following control is control causing the vehicle M to follow a vehicle as a followed target while maintaining a distance between the vehicle M and the vehicle as the followed target in the front. By performing the following control, the processing load of the vehicle M relating to automatic driving control is reduced than the case without the following control. The lower portion of FIG. 9 illustrates THW in the situation of the upper portion of FIG. 9.

As described above, the automatic driving control device 100 performs the first process and executes control based on the determining result of the determining part 144. Accordingly, vehicle control with which the occupant is comfortable can be realized.

[Flowchart]

Figure 10:
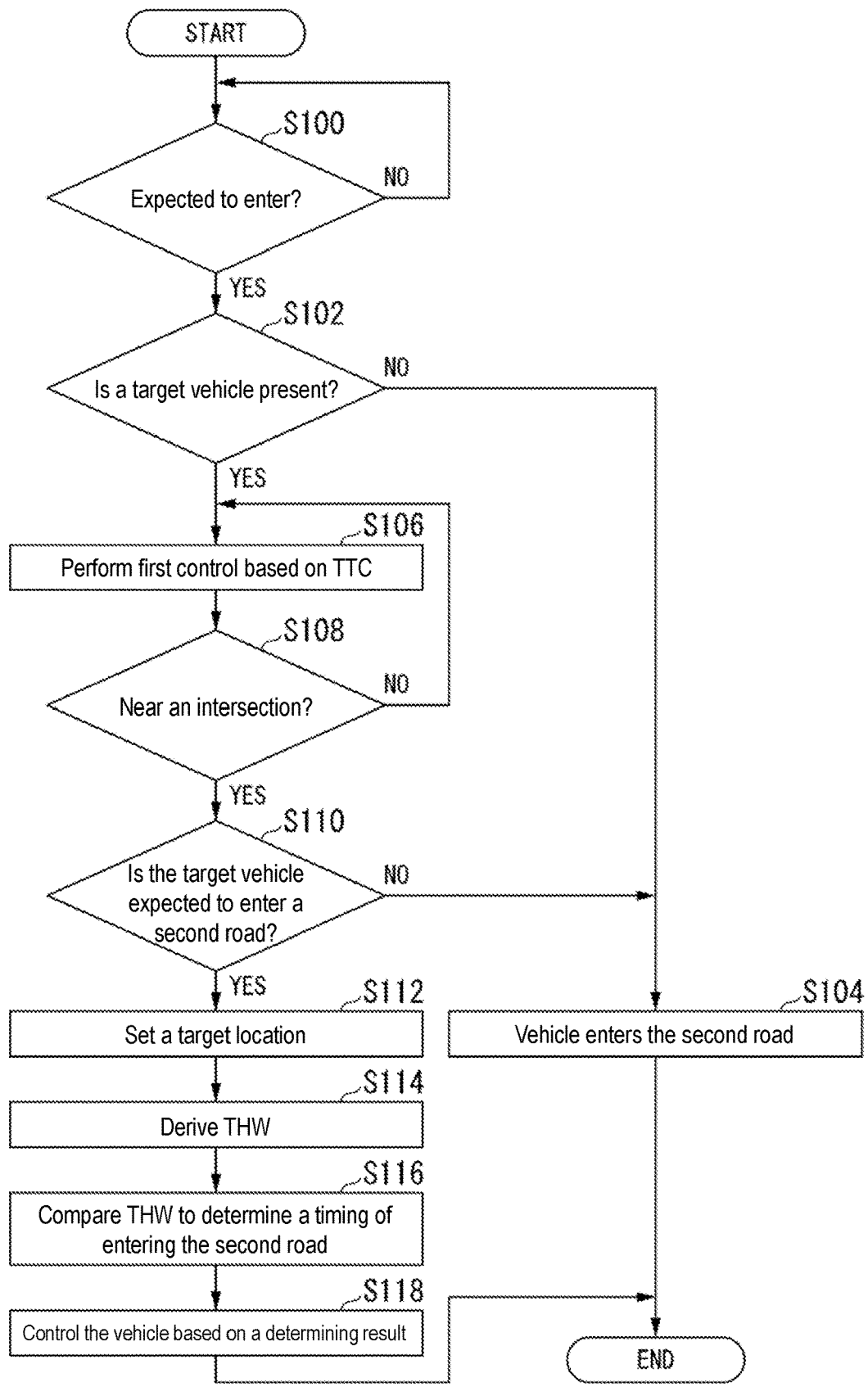
FIG. 10 is a flowchart illustrating an example of a flow of processes executed by an automatic driving control device 100.

FIG. 10 is a flowchart illustrating an example of a flow of processes executed by the automatic driving control device 100. The process is a process executed in the case where the vehicle M arrives within the predetermined distance (dozens of meters or hundreds of meters) from the intersection.

Firstly, the action plan generation part 140 determines whether the vehicle M is expected to enter the second road R2 (Step S100). In the case where the vehicle M is expected to enter the second road R2, the action plan generation part 140 determines whether a target vehicle is present. The target vehicle is a vehicle present in the –X direction with respect to the intersection and about to enter the intersection, and is a vehicle present within a set distance from the intersection (see FIGS. 3, 4, and 6 to 8). The target vehicle may be a vehicle simply approaching the intersection, and may also be a vehicle to enter the second road R2 (a vehicle traveling on a right-turn special lane or a vehicle whose direction indicator indicates a right turn). In addition, the target vehicle may also be another vehicle with the possibility of turning right.

In the case where the target vehicle is not present, the action plan generation part 140 controls the vehicle M to enter the second road R2 (Step S104). For example, the action plan generation part 140 performs control suppressing drastic deceleration or turning and causes the vehicle M to enter the second road R2. At this time, the first process is not performed.

In the case where the target vehicle is present, the first processing part 142 performs the first process based on TTC between the vehicle M and the another vehicle (Step S106). Then, the determining part 144 determines whether the vehicle M is near the intersection (e.g., whether the vehicle M arrives at the stop line SL) (Step S108). In the case where the vehicle M is not near the intersection, the flow returns to the process of Step S106.

In the case where the vehicle M is near the intersection, the determining part 144 determines whether the target vehicle is expected to enter the second road R2 (Step S110). The target vehicle being expected to enter the second road R2 refers to, for example that the target vehicle travels in the special lane for entering the second road or the direction indicator indicates entry into the second road. In the case where the target vehicle is not expected to enter the second road R2, the flow proceed to the process of Step S104. In the case where, among the target vehicles, the another vehicle m1 is expected to enter the second road R2 and the another vehicle m2 is not expected to enter into the second road, the determining part 144 may set the another vehicle m1 expected to enter the second road R2 as the target vehicle and perform the subsequent process, and may not set the another vehicle m2 as a processing target in the subsequent process.

In the case where the target vehicle is expected to enter the second road R2, the determining part 144 sets the reference position EN (Step S112) and derives THW based on the set reference position EN, the position and the velocity of the vehicle M, and the position and the velocity of the another vehicle (Step S114).

Then, the determining part 144 makes comparison on the derived THW, and, based on the comparison result, determines the timing at which the vehicle M enters the second road R2 (Step S116). Then, the second processing part 146 controls the vehicle M based on the determining result of Step S114 (Step S118). Accordingly, one routine of the flowchart ends.

According to the above process, the automatic driving control device 100 can realize vehicle control with which the occupant is comfortable by performing the first process and determining to travel before or after which vehicle in the second road R2 by using THW, for example.

For example, there is a case that, before the vehicle M arrives at the stop line SL, the automatic driving control device 100 cannot recognize the details of the shape of the intersection or the details of the state of the another vehicle about to enter the intersection. In such case, the vehicle M performs the first process. The index (TTC) used in the first process can be accurately obtained even before the vehicle M is relatively near the stop line SL. The automatic driving control device 100 performs the first process and, at the moment, exerts control for a relative relation between the another vehicle and the vehicle M at this time point does not interfere with the another vehicle and that the vehicle M enters the second road R2 smoothly.

In the case where the vehicle M arrives at the stop line SL, the automatic driving control device 100 can recognize the details of the shape of the intersection, the state of the another vehicle about to enter the intersection (the traveling position or the traveling lane, the on/off state of the direction indicator, the traveling track). Moreover, the automatic driving control device 100 may easily predict a future track of the another vehicle. In the case where the vehicle M arrives at the stop line SL, the automatic driving control device 100 can more accurately derive the time (THW) at which the another vehicle arrives at the reference position EN. Accordingly, the automatic driving control device 100 determines the timing at which the vehicle M enters the second road R2 by using THW, and causes the vehicle M to enter the second road R2 at the determined timing.

Accordingly, the automatic driving control device 100 performs control by using an index (e.g., TTC) capable of accurately conducting derivation at the moment at a position where the vehicle M is distant from the intersection, and performs control by using an index (e.g., THW) capable of accurately making derivation and reflecting the state of the another vehicle at the moment at a position where the vehicle M is near the intersection. Consequently, the discomfort of the occupant can be reduced, and the vehicle M can quickly and smoothly enter the second road R2.

According to the first embodiment described above, the automatic driving control device 100 controls the vehicle M based on the first relative relation and the second relative relation, determines the timing at which the vehicle M enters the second road R2 based on the relative relation between the reference position EN and the velocity and the position of the vehicle M and the relative relation between the reference position EN and the velocity and the position of the another vehicle (m1, m2) in the case where the vehicle M is near the intersection and the another vehicle m1 and the another vehicle m2 are expected to enter the second road R2, and controls the vehicle M by using the determined timing. Thus, vehicle control with which the occupant is comfortable can be realized.

Second Embodiment

In the following, the second embodiment will be described. In the first embodiment, the process in the case where the vehicle M turns left is described. Comparatively, the second embodiment describes a process in the case where the vehicle M turns right. In the following, the description will focus on the difference with respect to the first embodiment.

Figure 11:
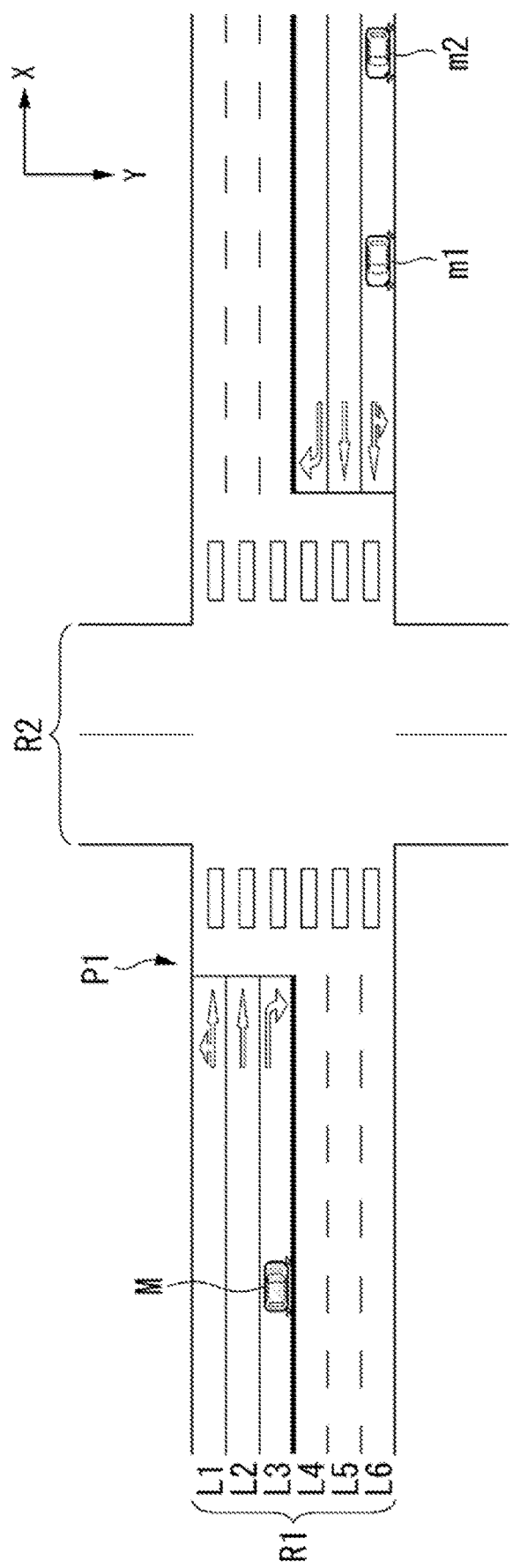
FIG. 11 is a view illustrating a case in which the first process is performed.

FIG. 11 is a view illustrating a case in which the first process is performed. In the second embodiment, the vehicle M travels in the lane L3 toward the intersection and turns right to enter the second road R2. The another vehicle m1, the another vehicle m2, and the another vehicle m3 (not shown in FIG. 11) travel in order in the lane L6 toward the intersection. The another vehicle m1, the another vehicle m2, and the another vehicle m3, for example, are expected to turn left to enter the second road R2.

The recognition part 130 recognizes, in front of a predetermined position P1 in front of the intersection, the intersection, the another vehicle m1, and the another vehicle m2. In such case, the first processing part 142 performs the first process described in the first embodiment. The first processing part 142 controls the vehicle M, so that TTC between the hypothetical vehicle Im set between the another vehicle m1 and the another vehicle m2 and the vehicle M becomes the middle between TTC between the vehicle M and the another vehicle m1 and TTC between the vehicle M and the another vehicle m2.

Figure 12:
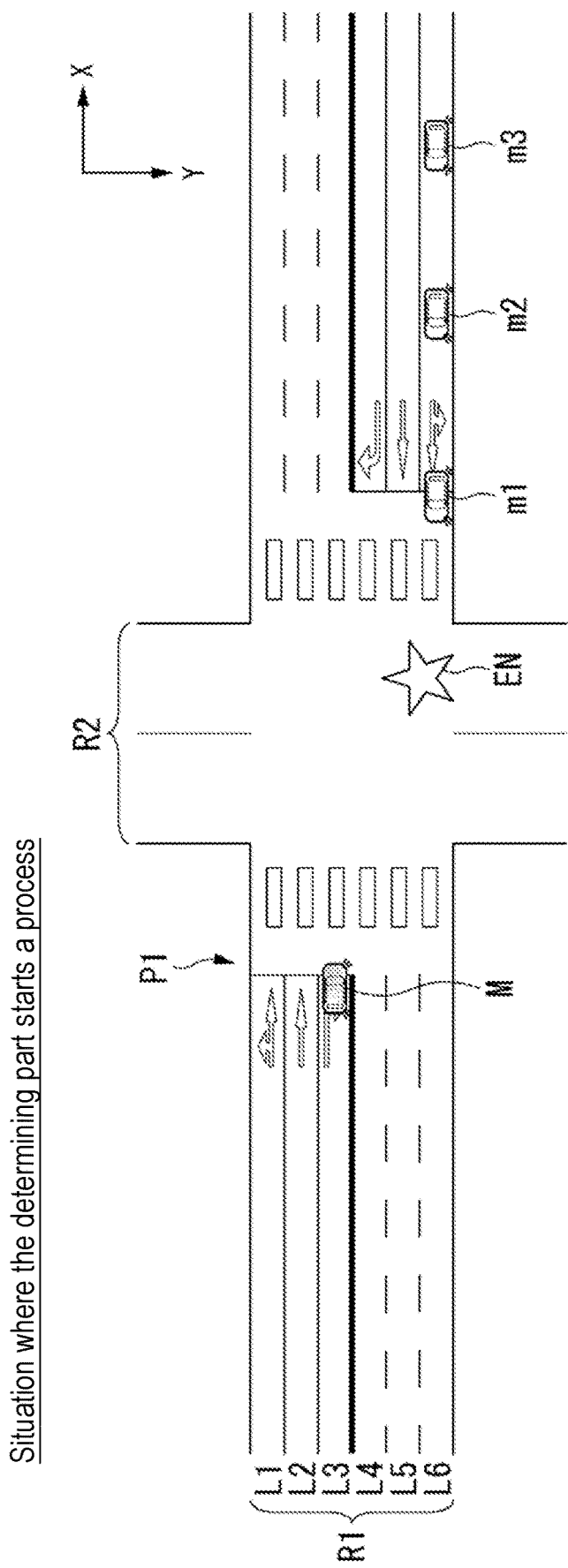
FIG. 12 is a view describing a process executed by the determining part 144 of the second embodiment.

FIG. 12 is a view describing a process executed by the determining part 144 of the second embodiment. In the case where the vehicle M arrives at the predetermined position P1, the determining part 144 compares TTC(M) between the vehicle M and the reference position EN, TTC(m1) between the another vehicle m1 and the reference position EN, TTC(m2) between the another vehicle m2 and the reference position EN, and TTC(m3) between the another vehicle m3 and the reference position EN, and determines at which timing the vehicle M enters the second road R2. In addition, the second processing part 146 causes the vehicle M to enter the second road R2 based on the determining result of the determining part 144.

The lane L3 is an example of "the first lane as a lane in which the vehicle travels". The lane L5 is an example of "the second lane as a lane which is provided between the first lane and the third lane, in which a third vehicle travels in the second direction, and in which the third vehicle is prohibited from entering the second road from the second lane,". The lane L6 is an example of "the third lane as a lane which allows the first another vehicle and the second another lane traveling in the third lane to enter the second road from the third lane, and".

In the case where a vehicle traveling in the lane L5 is not present in the periphery of the first another vehicle m1 and the second another vehicle m2, the first processing part 142 may perform vehicle control (first process) based on the first relative relation and the second relative relation. In the case where a vehicle traveling in the lane L5 is present in the periphery of the first another vehicle m1 and the second another vehicle m2, the first processing part 142 may not perform vehicle control (first process) based on the first relative relation and the second relative relation.

According to the second embodiment described above, the automatic driving control device 100 can achieve effects same as those of the first embodiment even in the case where the vehicle M turns right to enter the second road R2.

While the embodiment describes the case where multiple another vehicles (the first another vehicle m1 and the second another vehicle m2) are present in the lane L3 or the lane L6, the same process may also be executed in the case where one vehicle is present in the lane L3 and the lane L6. In such case, the vehicle M performs control so that TTC or THW of the vehicle M and the another vehicle is equal to or greater than the predetermined degree and enters the second road R2.

Moreover, in the case where multiple vehicles are present in the lane L3 or the lane L6, the process of the embodiment is applicable, and in the case where one vehicle is present in the lane L3 or the lane L6, a process different from the process of the embodiment may also be executed.

[Hardware Configuration]

Figure 13:
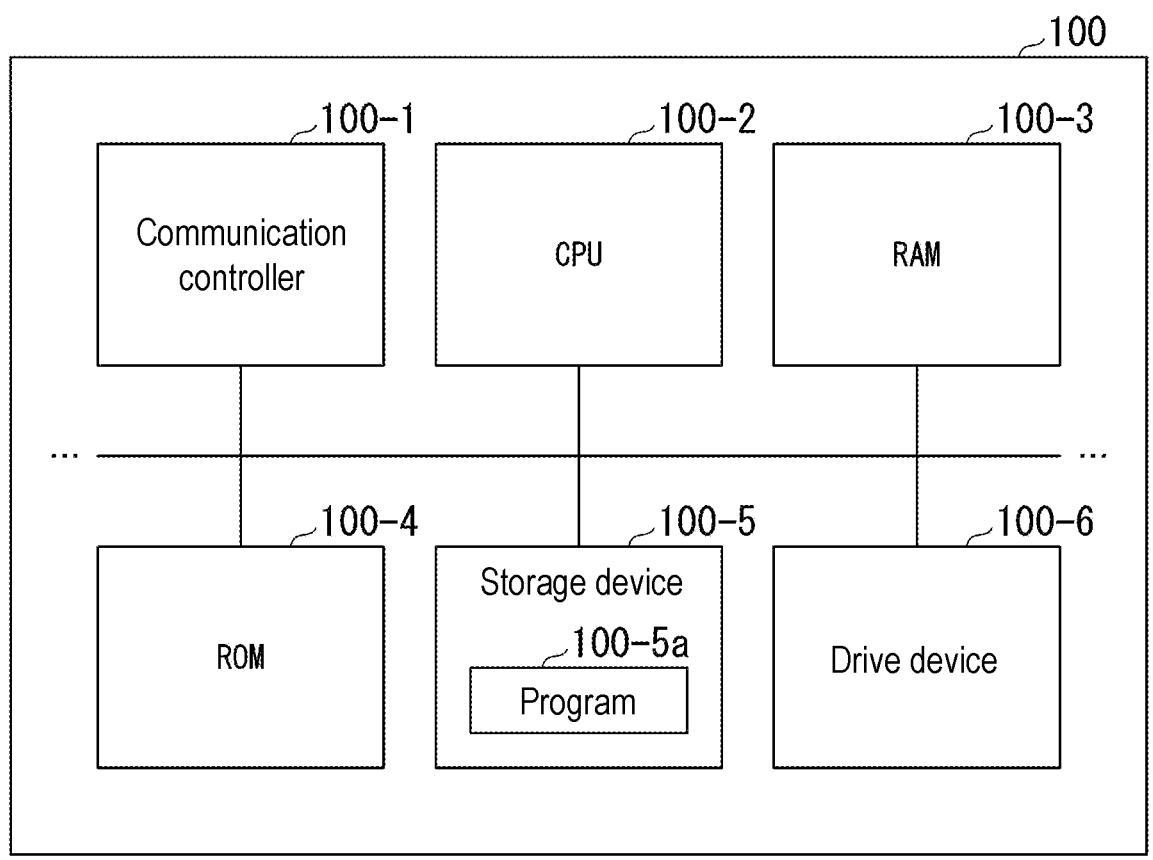
FIG. 13 is a diagram illustrating an example of a hardware configuration of the automatic driving control device 100 of the embodiment.

FIG. 13 is a diagram illustrating an example of a hardware configuration of the automatic driving control device 100 of the embodiment. As shown in the figure, the automatic driving control device 100 is in a configuration in which a communication controller 100-1, a CPU 100-2, a random access memory (RAM) 100-3 used as a working memory, a read only memory (ROM) 100-4 storing a boot program, a storage device 100-5 such as a flash memory or a hard disk drive (HDD), and a drive device 100-6, etc., are connected with each other through an internal bus or a designated communication line. The communication controller 100-1 performs communication with forming elements other than the automatic driving control device 100. The storage device 100-5 stores a program 100-5a executed by the CPU 100-2. The program is expanded in the RAM 100-3 by a direct memory access (DMA) controller (not shown) and executed by the CPU 100-2. Accordingly, some or all of the first control part 120, the second control part 160, and functional parts included therein are realized.

The embodiment described above can be represented as follows. A vehicle control device includes a storage device storing a program and a hardware processor. By executing the program stored in the storage device by the processor, the vehicle control device recognizes an intersection present in front of a vehicle proceeding in a first direction on a first road, a first another vehicle proceeding in a second direction opposite to the first direction on the first road to approach the intersection, and a second another vehicle traveling after the first another vehicle, in a case where the vehicle is expected to enter a second road differing from the first road and connected to the intersection, controls the vehicle based on a first relative relation between a position and a velocity of the first another vehicle and a position and a velocity of the vehicle and a second relative relation between a position and a velocity of the second another vehicle and the position and the velocity of the vehicle; determines, in a case where the first processing part performs control, the vehicle approaches the intersection, and the first another vehicle and the second another vehicle are expected to enter the second road, determining whether the vehicle enters the second road after the first another vehicle and before the second another vehicle or enters the second road after the second another vehicle based on a relative relation between a basis position set at the intersection or in a vicinity of the intersection and the velocity and the position of the vehicle, a relative relation between the basis position and the velocity and the position of the first another vehicle, and a relative relation between the basis position and the velocity and the position of the second another vehicle, and controls the vehicle based on a result of a determination.

Although the embodiments for carrying out the disclosure have been described above with the embodiments, the disclosure is not limited to these embodiments, and various modifications and substitutions can be added without departing from the gist of the disclosure.

What is claimed is:

1. A vehicle control device, comprising:
   a recognition part, recognizing an intersection present in front of a vehicle proceeding in a first direction on a first road, a first another vehicle proceeding in a second direction opposite to the first direction on the first road to approach the intersection, and a second another vehicle traveling after the first another vehicle;
   a first processing part, in a case where the vehicle is expected to enter a second road differing from the first road and connected to the intersection, controlling the vehicle based on a first relative relation between a position and a velocity of the first another vehicle and a position and a velocity of the vehicle and a second relative relation between a position and a velocity of the second another vehicle and the position and the velocity of the vehicle;
   a determining part, in a case where the first processing part performs control, the vehicle approaches the intersection, and the first another vehicle and the second another vehicle are expected to enter the second road, determining whether the vehicle enters the second road after the first another vehicle and before the second another vehicle or enters the second road after the second another vehicle based on a relative relation between a basis position set at the intersection or in a vicinity of the intersection and the velocity and the position of the vehicle, a relative relation between the basis position and the velocity and the position of the first another vehicle, and a relative relation between the basis position and the velocity and the position of the second another vehicle; and
   a second processing part, controlling the vehicle based on a result of a determination of the determining part.

2. The vehicle control device as claimed in claim 1, wherein the first process part performs a first process based on a first index obtained by dividing a distance relating to a traveling direction from the vehicle to the first another vehicle by a velocity difference between the vehicle and the first another vehicle and a second index obtained by dividing a distance relating to the traveling direction from the vehicle to the second another vehicle by a velocity difference between the vehicle and the second another vehicle.

3. The vehicle control device as claimed in claim 2, wherein the first processing part executes the first process so that a third index is set between the first index and the second index, and
   the third index is an index obtained by dividing a distance relating to the traveling direction from a hypothetical vehicle hypothetically set between the position of the first another vehicle and the position of the second another vehicle to the vehicle by a velocity obtained based on the velocity of the first another vehicle and the velocity of the second another vehicle.

4. The vehicle control device as claimed in claim 3, wherein the determining part determines whether the vehicle enters the second road after the first another vehicle and before the second another vehicle or enters the second road after the second another vehicle based on a fourth index obtained by dividing a distance from the vehicle to the basis position by the velocity of the vehicle, a fifth index obtained by dividing a distance from the first another vehicle to the basis position by the velocity of the first another vehicle, and a sixth index obtained by dividing a distance from the second another vehicle to the basis position by the velocity of the second another vehicle.

5. The vehicle control device as claimed in claim 3, wherein the second processing part causes the vehicle to follow the first another vehicle in a case where the determining part determines that the vehicle enters the second road after the first another vehicle and before the second another vehicle, and causes the vehicle to follow the second another vehicle in a case where the determining part determines that the vehicle enters the second road after the second another vehicle.

6. The vehicle control device as claimed in claim 3, wherein the first road at least comprises a first lane, a second lane, and a third lane,
   the first lane is a lane in which the vehicle travels,
   the second lane is a lane which is provided between the first lane and the third lane, in which a third vehicle travels in the first direction, and in which the third vehicle is prohibited from entering the second road from the second lane,
   the third lane is a lane which allows the first another vehicle and the second another lane traveling in the third lane to enter the second road from the third lane, and
   the first processing part controls the vehicle based on the first relative relation and the second relative relation in a case where a vehicle traveling in the second lane on a periphery of the vehicle is not present.

7. The vehicle control device as claimed in claim 3, wherein the first road at least comprises a first lane, a second lane, and a third lane,
   the first lane is a lane in which the vehicle travels, the second lane is a lane which is provided between the first lane and the third lane, in which a third vehicle travels in the second direction, and in which the third vehicle is prohibited from entering the second road from the second lane, the third lane is a lane which allows the first another vehicle and the second another lane traveling in the third lane to enter the second road from the third lane, and the first processing part controls the vehicle based on the first relative relation and the second relative relation in a case where a vehicle traveling in the second lane on a periphery of the first another vehicle and the second another vehicle is not present.

8. The vehicle control device as claimed in claim 2, wherein the determining part determines whether the vehicle enters the second road after the first another vehicle and before the second another vehicle or enters the second road after the second another vehicle based on a fourth index obtained by dividing a distance from the vehicle to the basis position by the velocity of the vehicle, a fifth index obtained by dividing a distance from the first another vehicle to the basis position by the velocity of the first another vehicle, and a sixth index obtained by dividing a distance from the second another vehicle to the basis position by the velocity of the second another vehicle.

9. The vehicle control device as claimed in claim 2, wherein the second processing part causes the vehicle to follow the first another vehicle in a case where the determining part determines that the vehicle enters the second road after the first another vehicle and before the second another vehicle, and causes the vehicle to follow the second another vehicle in a case where the determining part determines that the vehicle enters the second road after the second another vehicle.

10. The vehicle control device as claimed in claim 2, wherein the first road at least comprises a first lane, a second lane, and a third lane, the first lane is a lane in which the vehicle travels,
the second lane is a lane which is provided between the first lane and the third lane, in which a third vehicle travels in the first direction, and in which the third vehicle is prohibited from entering the second road from the second lane,
the third lane is a lane which allows the first another vehicle and the second another lane traveling in the third lane to enter the second road from the third lane, and
the first processing part controls the vehicle based on the first relative relation and the second relative relation in a case where a vehicle traveling in the second lane on a periphery of the vehicle is not present.

11. The vehicle control device as claimed in claim 2, wherein the first road at least comprises a first lane, a second lane, and a third lane, the first lane is a lane in which the vehicle travels,
the second lane is a lane which is provided between the first lane and the third lane, in which a third vehicle travels in the second direction, and in which the third vehicle is prohibited from entering the second road from the second lane,
the third lane is a lane which allows the first another vehicle and the second another lane traveling in the third lane to enter the second road from the third lane, and
the first processing part controls the vehicle based on the first relative relation and the second relative relation in a case where a vehicle traveling in the second lane on a periphery of the first another vehicle and the second another vehicle is not present.

12. The vehicle control device as claimed in claim 1, wherein the determining part determines whether the vehicle enters the second road after the first another vehicle and before the second another vehicle or enters the second road after the second another vehicle based on a fourth index obtained by dividing a distance from the vehicle to the basis position by the velocity of the vehicle, a fifth index obtained by dividing a distance from the first another vehicle to the basis position by the velocity of the first another vehicle, and a sixth index obtained by dividing a distance from the second another vehicle to the basis position by the velocity of the second another vehicle.

13. The vehicle control device as claimed in claim 12, wherein the determining part determines whether the vehicle enters the second road after the first another vehicle and before the second another vehicle based on a first comparison result obtained by comparing the fourth index, the fifth index, and a first threshold and a second comparison result obtained by comparing the fourth index, the sixth index, and a second threshold.

14. The vehicle control device as claimed in claim 13, wherein the determining part determines that the vehicle enters the second road after the second another vehicle in a case where the determining part determines that the vehicle does not enter the second road after the first another vehicle and before the second another vehicle.

15. The vehicle control device as claimed in claim 12, wherein the second processing part causes the vehicle to follow the first another vehicle in a case where the determining part determines that the vehicle enters the second road after the first another vehicle and before the second another vehicle, and causes the vehicle to follow the second another vehicle in a case where the determining part determines that the vehicle enters the second road after the second another vehicle.

16. The vehicle control device as claimed in claim 1, wherein the second processing part causes the vehicle to follow the first another vehicle in a case where the determining part determines that the vehicle enters the second road after the first another vehicle and before the second another vehicle, and causes the vehicle to follow the second another vehicle in a case where the determining part determines that the vehicle enters the second road after the second another vehicle.

17. The vehicle control device as claimed in claim 1, wherein the first road at least comprises a first lane, a second lane, and a third lane, the first lane is a lane in which the vehicle travels,
the second lane is a lane which is provided between the first lane and the third lane, in which a third vehicle travels in the first direction, and in which the third vehicle is prohibited from entering the second road from the second lane,
the third lane is a lane which allows the first another vehicle and the second another lane traveling in the third lane to enter the second road from the third lane, and
the first processing part controls the vehicle based on the first relative relation and the second relative relation in a case where a vehicle traveling in the second lane on a periphery of the vehicle is not present.

18. The vehicle control device as claimed in claim 1, wherein the first road at least comprises a first lane, a second lane, and a third lane, the first lane is a lane in which the vehicle travels, the second lane is a lane which is provided between the first lane and the third lane, in which a third vehicle travels in the second direction, and in which the third vehicle is prohibited from entering the second road from the second lane, the third lane is a lane which allows the first another vehicle and the second another lane traveling in the third lane to enter the second road from the third lane, and the first processing part controls the vehicle based on the first relative relation and the second relative relation in a case where a vehicle traveling in the second lane on a periphery of the first another vehicle and the second another vehicle is not present.

19. A vehicle control method, comprising:

by a computer, recognizing an intersection present in front of a vehicle proceeding in a first direction on a first road, a first another vehicle proceeding in a second direction opposite to the first direction on the first road to approach the intersection, and a second another vehicle traveling after the first another vehicle;

in a case where the vehicle is expected to enter a second road differing from the first road and connected to the intersection, controlling the vehicle based on a first relative relation between a position and a velocity of the first another vehicle and a position and a velocity of the vehicle and a second relative relation between a position and a velocity of the second another vehicle and the position and the velocity of the vehicle;

in a case where control is performed based on the first relative relation and the second relative relation, the vehicle approaches the intersection, and the first another vehicle and the second another vehicle are expected to enter the second road, determining whether the vehicle enters the second road after the first another vehicle and before the second another vehicle or enters the second road after the second another vehicle based on a relative relation between a basis position set in front of the intersection and the velocity and the position of the vehicle, a relative relation between the basis position and the velocity and the position of the first another vehicle, and a relative relation between the basis position and the velocity and the position of the second another vehicle; and controlling the vehicle based on a result of a determination.

20. A non-transitory computer readable storage medium, storing a program causing a computer to:

recognize an intersection present in front of a vehicle proceeding in a first direction on a first road, a first another vehicle proceeding in a second direction opposite to the first direction on the first road to approach the intersection, and a second another vehicle traveling after the first another vehicle;

in a case where the vehicle is expected to enter a second road differing from the first road and connected to the intersection, control the vehicle based on a first relative relation between a position and a velocity of the first another vehicle and a position and a velocity of the vehicle and a second relative relation between a position and a velocity of the second another vehicle and the position and the velocity of the vehicle;

in a case where control is performed based on the first relative relation and the second relative relation, the vehicle approaches the intersection, and the first another vehicle and the second another vehicle are expected to enter the second road, determine whether the vehicle enters the second road after the first another vehicle and before the second another vehicle or enters the second road after the second another vehicle based on a relative relation between a basis position set in front of the intersection and the velocity and the position of the vehicle, a relative relation between the basis position and the velocity and the position of the first another vehicle, and a relative relation between the basis position and the velocity and the position of the second another vehicle; and controlling the vehicle based on a result of a determination.

* * * * *